United States Patent
Kim et al.

(10) Patent No.: US 8,299,378 B2
(45) Date of Patent: Oct. 30, 2012

(54) POSITION INDICATING DEVICE

(75) Inventors: In-Kyum Kim, Chungcheongbuk-Do (KR); Kil-Young Ahn, Daejeon (KR)

(73) Assignee: LS Industrial Systems Co., Ltd., Gyeonggi-Do (KR)

( * ) Notice: Subject to any disclaimer, the term of this patent is extended or adjusted under 35 U.S.C. 154(b) by 427 days.

(21) Appl. No.: 12/648,356

(22) Filed: Dec. 29, 2009

(65) Prior Publication Data

US 2010/0163374 A1 Jul. 1, 2010

(30) Foreign Application Priority Data

Dec. 31, 2008 (KR) .................. 10-2008-0138669

(51) Int. Cl.
*H01H 9/20* (2006.01)
*H02B 11/00* (2006.01)

(52) U.S. Cl. .................................................. 200/50.26

(58) Field of Classification Search ............... 200/50.26
See application file for complete search history.

(56) References Cited

U.S. PATENT DOCUMENTS

| | | | |
|---|---|---|---|
| 5,278,722 A | 1/1994 | Peruso | |
| 7,847,203 B2 * | 12/2010 | Narayanan et al. | 200/50.26 |
| 2002/0079201 A1 | 6/2002 | Yang | |
| 2009/0014292 A1 | 1/2009 | Lyu | |
| 2009/0015357 A1 | 1/2009 | Ahn | |
| 2009/0039988 A1 | 2/2009 | Song et al. | |

FOREIGN PATENT DOCUMENTS

| | | |
|---|---|---|
| DE | 29616546 | 12/1996 |
| JP | 61-192611 | 11/1986 |
| JP | 62-101320 | 6/1987 |
| JP | 4-101206 | 9/1992 |
| JP | 10-201020 | 7/1998 |
| JP | 11-262118 | 9/1999 |
| JP | 2002-209312 | 7/2002 |

OTHER PUBLICATIONS

Japan Office action, mail date is Jan. 10, 2012.

* cited by examiner

*Primary Examiner* — Renee Luebke
*Assistant Examiner* — Lheiren Mae Caroc
(74) *Attorney, Agent, or Firm* — Greenblum & Bernstein, P.L.C.

(57) ABSTRACT

Disclosed is a position indicating device for a pull-out type circuit breaker used to cut off a current, the position indicating device including a position indicating plate installed at a lower surface of the circuit breaker to be rotatable up and down and having an arrow marked thereon, an indication supporter installed at a cradle and having stepped pressing surfaces for pressing up the position indicating plate, and a frame portion of a movable carriage, the frame portion having windows for externally showing a rotated state of the position indicating plate, whereby when the circuit breaker is docked with the cradle, the position indicating plate is rotated by the indication supporter so as to indicate the position of the circuit breaker through the windows, thereby allowing a fast and precise recognition of the position of the circuit breaker.

5 Claims, 3 Drawing Sheets

POSITION INDICATING DEVICE

CROSS-REFERENCE TO RELATED APPLICATION

Pursuant to 35 U.S.C. §119(a), this application claims the benefit of earlier filing date and right of priority to Korean Application No. 10-2008-0138669, filed on Dec. 31, 2008, the contents of which is incorporated by reference herein in its entirety.

BACKGROUND OF THE INVENTION

1. Field of the Invention

The present invention relates to a position indicating device for a circuit breaker, and particularly, to a position indicating device for a circuit breaker capable of fast and precisely indicating a position of the circuit breaker moved is within a cradle in which the circuit breaker is accommodated.

2. Background of the Invention

In general, a circuit breaker for high voltage is categorized into a pull-out type and a stationary type. The stationary type circuit breaker merely has a breaker main body secured at a position within an electric power distributing board. The pull-out type circuit breaker includes a movable carriage for conveying a breaker main body to facilitate maintenance and repair of the circuit breaker, terminals electrically connected to a power source side and a load side of a circuit and an outer case, called a cradle, having terminals electrically connected to the breaker main body, structure of which allows push-in and pull-out of the breaker main body.

Here, the pull-out type circuit breaker is employed in a distributing board, by which various electric devices, including the circuit breaker, all disposed therein, are managed so as to drive or control a power station, a substation and the like and to drive a motor. Also, the circuit breaker is accommodated in the cradle secured with the distributing board, and has a run position and a test position. At the run position, a power source side terminal and a load side terminal of the circuit breaker are connected to those of the cradle to thereby be connected to a power source and a load of a circuit so that the circuit breaker is operable, while at the test position, those terminals of the circuit breaker are separated from the terminals of the cradle so that a switching operation of the breaker main body is merely tested.

In order for an operator to move the breaker main body to the test position with respect to the cradle, first, an interlock link provided at the breaker main body is held up and the breaker main body is pulled out. The interlock link is then inserted in a test position determining groove of an interlock plate provided at the cradle. At the position, the power source side terminal and the load side terminal of the breaker main body are separated from those of the cradle. Accordingly, control power is merely supplied to the breaker main body, thereby merely allowing the switching test of the circuit breaker main body. Here, the operator can identify the corresponding position of the breaker main body by viewing a word, which is written on an indication sticker for indicating a test position, the indication sticker located on an upper surface of the interlock plate of the cradle.

Also, the operator may connect the terminals of the breaker main body to those of the crank so as to change the position of the circuit breaker from the test position to the run position at which the circuit is connected to the breaker main body. Here, the operator holds up the interlock link to separate the same from the test position determining groove and then pushes the breaker main body toward the cradle terminals, thereby moving the breaker main body. Afterwards, the interlock link is inserted into a run position determining groove of the cradle so that the breaker main body is located at the run position. After the breaker main body is moved to the run position, the operator can identify the corresponding position by viewing a word, which is written on an indication sticker for indicating the run position, the indication sticker also located on the upper surface of the interlock plate of the cradle.

Here, the circuit breaker, as aforementioned, includes the circuit breaker main body and the movable carriage. The circuit breaker main body includes a plurality of terminals connectable to a power source side terminal and a load side terminal of the cradle, respectively, a main circuit portion provided with contacts prepared for each AC phase, a vacuum interrupter and the like for breaking a circuit between a power source and a load upon occurrence of a fault current on the circuit, and a switching mechanism for switching by closing or opening the main circuit portion. The movable carriage is employed to move the circuit breaker main body to the run position or the test position.

In the configuration of the cradle and the circuit breaker according to the related art, the indication sticker for indicating a position (run or test position) of the breaker main body is attached onto the upper surface of the interlock plate, which is located at a bottom surface of the cradle and the operator identifies the position of the breaker main body by checking the indication sticker attached on the position after moving the breaker main body to the corresponding position. However, the position indication sticker is not easily viewed due to being obscured by the circuit breaker main body, which results in difficulty in the fast and precise recognition of the position of the circuit breaker main body.

SUMMARY OF THE INVENTION

Therefore, in order to obviate the problem of the related art, an object of the present invention is to provide a position indicating device for a circuit breaker, by which a position of the circuit breaker can be identified fast and precisely.

To achieve these and other advantages and in accordance with the purpose of the present invention, as embodied and broadly described herein, there is provided a position indicating device including a position indicating plate installed at a lower surface of the movable carriage to be rotatable up and down and having a portion for indicating a position of the breaker main body, an indication supporter installed at the cradle and having stepped pressing surfaces for contacting the position indicating plate, and a frame portion of the movable carriage, the frame portion having windows for externally showing the portion for indicating the position of the breaker main body in accordance to the rotation of the position indicating plate.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
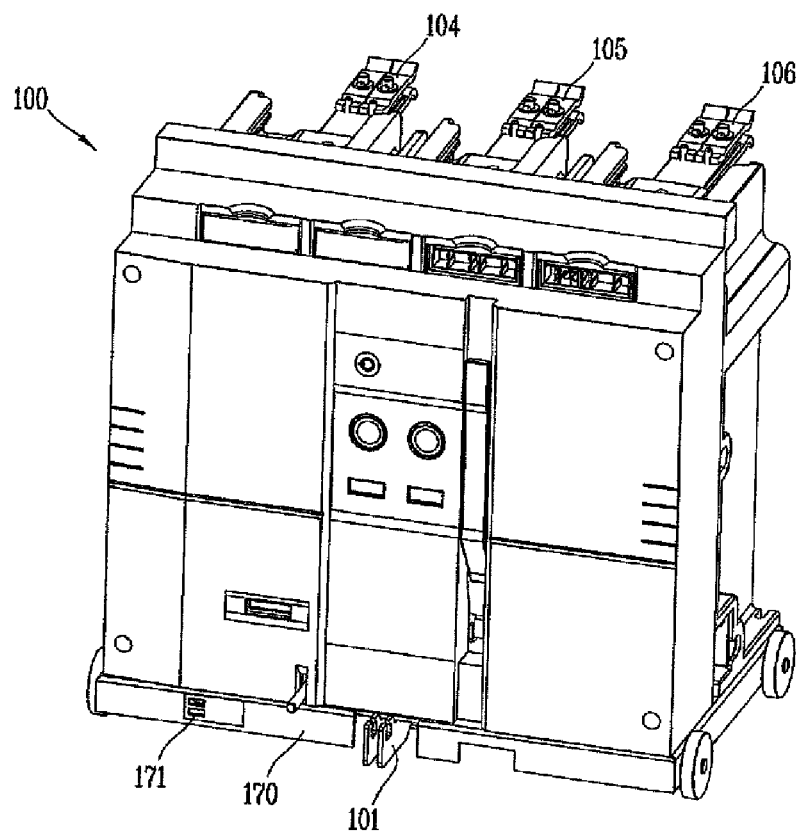
FIG. 1 is a perspective view showing a pull-out type circuit breaker having a circuit breaker main body having a position indicating device and a movable carriage in accordance with one embodiment of the present invention.

Description will now be given in detail of the present invention, with reference to the accompanying drawings.

Hereinafter, the preferred embodiment of a position indicating device for a circuit breaker according to the present invention will be described with reference to the accompanying drawings. Throughout the description, thickness of each line, a size of each component shown in the drawings may be overdrawn for the brief description and convenience. Also, terms to be explained later may be defined in consideration of functions in the present invention, so the terms may differ depending on a user's intension or an operator's intension or according to custom. Therefore, such terms should be defined based upon the contents over the entire specification of the present invention.

Also, the following embodiment may not limit the scope of the claims of the present invention but be merely illustrative for components disclosed in the to claims of the present invention. Also, the following embodiment may comply with a technical field over the entire specification of the present invention and other embodiments including equivalent components substitutable for the components of the claims can be embraced by the scope of the claims of the present invention.

EMBODIMENT

Figure 2:
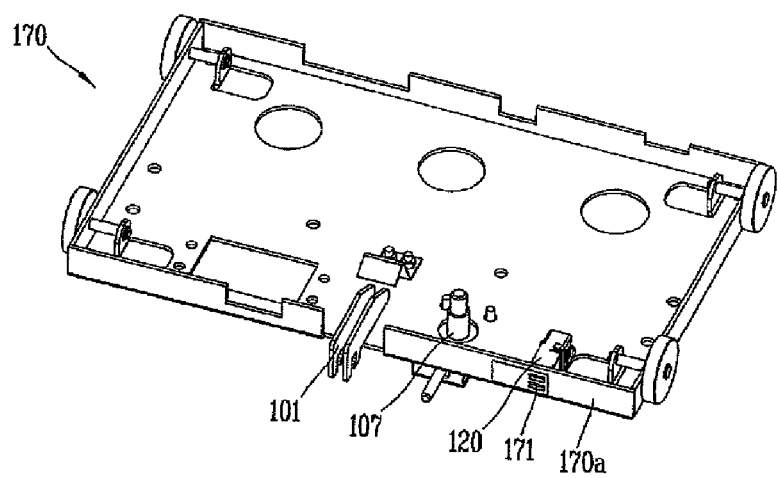
FIG. 2 is a low perspective view showing a structure of a lower surface of the movable carriage of FIG. 1 by turning over the movable carriage.
Figure 3:
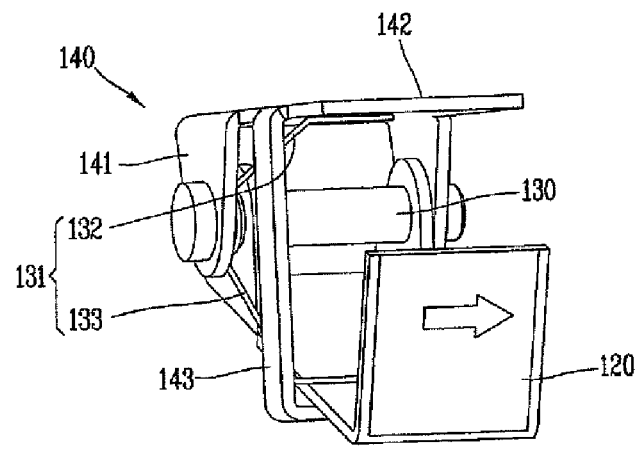
FIG. 3 is a perspective view showing a position indicating plate and a bracket installed at a right lower portion of the movable carriage of FIG. 2.

Description will be given with reference to FIGS. 1 to 3. As shown in FIGS. 1 to 3, a circuit breaker having a position indicating device in accordance with one embodiment of the present invention may include a breaker main body 100 having a switching mechanism for closing or opening an electrical circuit and contacts, the main body 100 being movable, a cradle 110 (see FIG. 4) having terminals 110a electrically connected to an electrical power source and an electrical load of an electric circuit and terminals electrically connected to the breaker main body 100, and a movable carriage 170 for supporting the breaker main body 100 and conveying the breaker main body 100 to a run position at which the breaker main body 100 is electrically connected to the terminals of the cradle and a test position at which the breaker main body 100 is separated from the terminals of the cradle and is allowed to be tested.

Figure 4:
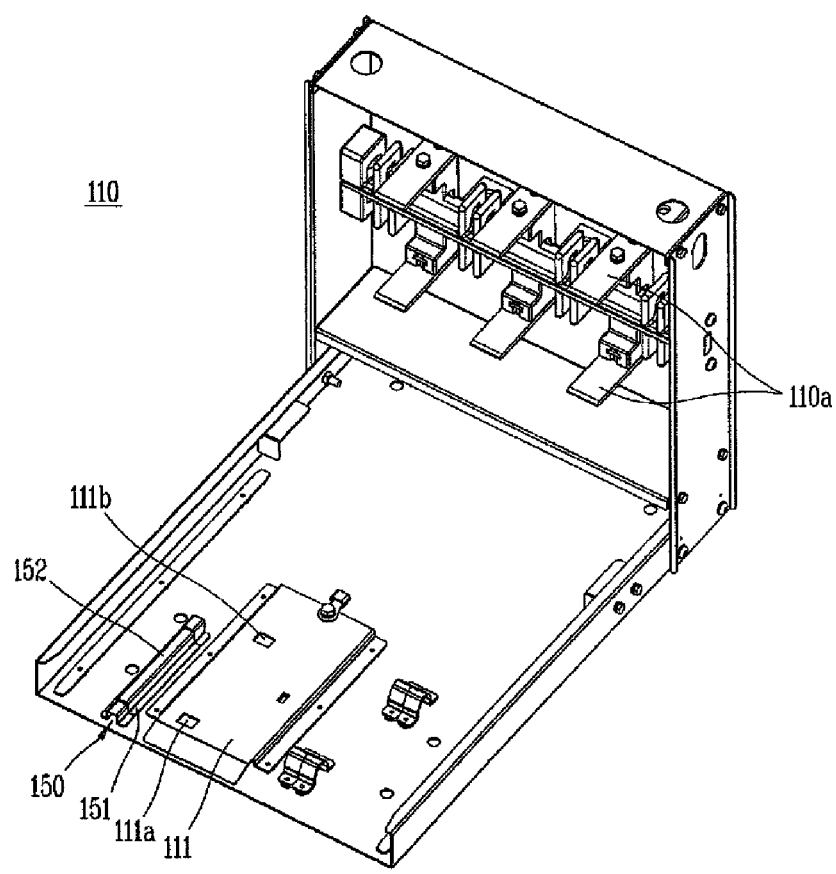
FIG. 4 is a perspective view of a cradle connected to the pull-out type circuit breaker of FIG. 1.

Referring to FIG. 1, the reference numerals 104, 105 and 106 designate terminals electrically connected to the terminals 110a of the cradle 110 (see FIG. 4). The reference numeral 171 designates a window disposed on a front plate of a frame portion 170a of the movable carriage 170. The reference numeral 101, in FIGS. 1 and 2, designates a handle coupling member for coupling a manipulation handle when the breaker main body 100 is manually moved to the test position or to the run position.

The reference numeral 107 in FIG. 2 designates an interlock rod connected to an interlock lever (reference numeral not given). When being pulled (taken) down, the interlock rod is inserted in a test position determining groove 111a or a run position determining groove 111b both on an interlock plate 111 (see FIG. 4). On the other hand, when being taken up, the interlock rod is separated from the test position determining groove 111a and the run position determining groove 111b.

A position indicating device for the circuit breaker according to the present invention may include a position indicating plate 120 installed at a lower surface of the movable carriage 170 to be rotatable up and down and having a portion on which a position of the breaker main body 100 is indicated (informed), an indication supporter 150 installed at the cradle 110 (see FIG. 4) having stepped pressing surfaces for contacting the position indicating plate 120 by stages, and the frame portion 170a of the movable carriage 170 having windows for externally showing the portion for indicating the position of the breaker main body 100 in accordance to the rotation of the position indicating plate 120.

As shown in FIGS. 2 and 3, the position indicating plate 120 may be installed at the lower surface of the movable carriage 170 to be rotatable up and down, and have a section (region) with an arrow for indicating the position of the breaker main body 100.

Still referring to FIGS. 2 and 3, the position indicating device according to the present invention may further include a pivot pin 130 and a return spring 131.

The pivot pin 130 may be disposed at the lower surface of the movable carriage 170 to support the position indicating plate 120 rotatable. The return spring 131 may be disposed at the lower surface of the movable carriage 170 to apply an elastic force to the position indicating plate 120 so as to be rotated, namely, biased in one direction (i.e., a clockwise direction in FIG. 3, i.e., a downward direction).

Also, the position indicating device according to the present invention may further include a bracket 140 having supporting plate portions 141 for supporting both end portions of the pivot pin 130 at the lower surface of the movable carriage 170. Here, the bracket 140 may further include a fixed plate 142 and a restricting plate 143.

The fixed plate 142 may be fixed to the lower surface of the movable carriage 170 and provided with the supporting plate portions 141 extending downwardly from both side surfaces thereof. The restricting plate 143 may face the fixed plate 142 and be disposed in parallel to the supporting plate portions 141. Also, the restricting plate 143 may provide a space in which the position indicating plate 120 is rotatable, and cooperate with the fixed plate 142 to define a rotation range of the position indicating plate 120. In other words, the position indicating plate 120 may be rotatably installed at the supporting plates 141 of the bracket 140 by the pivot pin 130 and rotated within the limited range between the fixed plate 142 and the restricting plate 143 facing each other with an inclination angle. Here, the return spring 131 may include an upper wire 132 supported by the fixed plate 142 and a lower wire 133 supported by the position indicating plate 120. A connection portion between the upper wire 132 and the lower wire 133 may be wound on the pivot pin 130.

Figure 5:
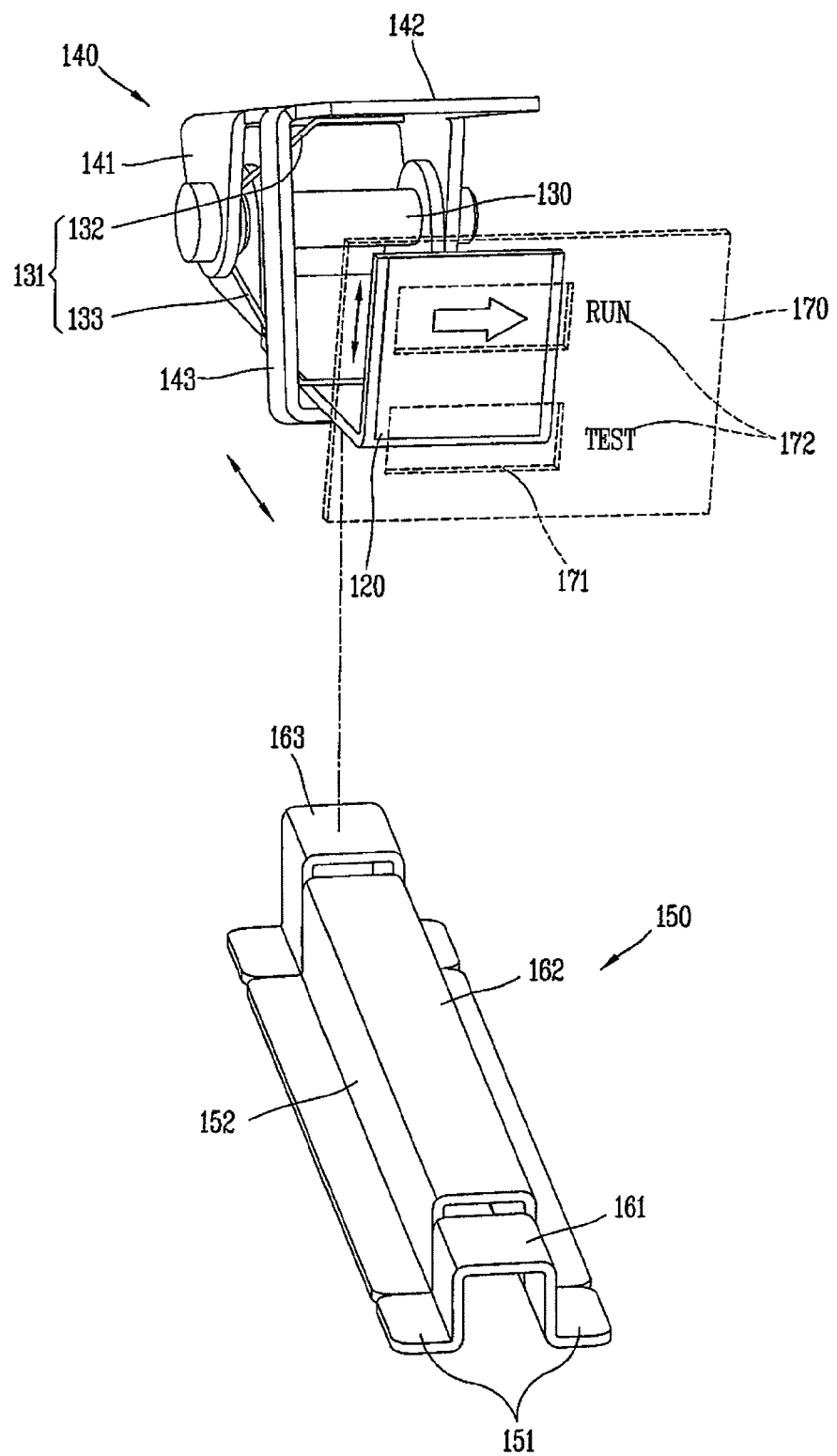
FIG. 5 is a perspective view showing an interrelation between the indicating plate of FIG. 3 and an indicating supporter of FIG. 4.

As shown in FIGS. 4 and 5, the indication supporter 150 may include a plurality of pressing surfaces (in other words contacting surfaces or guide surfaces) 161, 162 and 163, which are stepped each other with different heights so as to contact the position indicating plate 120. The indication supporter 150 may be installed at a bottom surface of the cradle 110.

Still referring to FIGS. 4 and 5, the indication supporter 150 may further include coupling plate portions 151 disposed at both sides in a proceeding direction of the movable carriage 170, and a pressing plate portion 152 disposed between the both coupling plate portions 151 for contacting the position indicating plate 120 in stages. When the breaker main body 100 is connected to the cradle 110 (more precisely speaking, when terminals of the breaker main body 100 is connected to terminals of the cradle 110), the pressing plate portion 152 functions to press the position indicating plate 120 in stages so as to hold up or down the same. The arrow on the position indicating plate 120 is moved to upper and lower windows 171 of the movable carriage 170. Position marking portions 172, such as TEST and RUN, may be marked at sides of the windows 171.

Here, the pressing plate portion 152 may include a first guiding surface 161 coming in contact with the position indicating plate 120 to guide the position indicating plate 120 to indicate a test position, a second guiding surface 162 connected to the first guiding surface 161 and protruding higher than the first guiding surface 161, and a third guiding surface 163 protruding higher than the second guide surface 162 in a connected state with the second guiding surface 162 and coming in contact with the position indicating plate 120 to guide the position indicating plate 120 to indicate a run position.

Referring to FIG. 5, windows 171 for externally showing a rotated state of the position indicating plate 120 may be formed at a front surface of the frame portion of the movable carriage 170.

Hereinafter, description will be given of an operation of the position indicating device for the circuit breaker in accordance with the present invention having such configuration.

As aforementioned, the breaker main body 100 for the circuit breaker according to the one embodiment of the present invention is configured to be movable to a run position at which terminals 104, 105 and 106 of the breaker main body 100 are connected to a power source side terminal and a load side terminal 110a of the cradle 110 and to a test position at which the terminals 104, 105 and 106 of the breaker main body 100 are separated from the power source side terminal and the load side terminal 110a of the cradle 110 so as to allow only testing of a switching operation of the breaker main body 110.

Hence, when the breaker main body 110 is moved to the run position and to the test position with being loaded on the movable carriage 170, the run position and the test position of the breaker main body 110 can be automatically indicated by virtue of the indication supporter 150 provided at the cradle 110, and the position indicating arrow of the position indicating plate 120, which is mounted at the movable carriage 170 and viewed through the windows 171 of the movable carriage 170.

First, in order for an operator to move the breaker main body 100 from a run position to a test position with respect to the cradle 110, the interlock lever provided at the breaker main body 100 is held up to separate the interlock rod 107 from the run position determining groove 111b of the interlock plate 111, and the interlock rod 107 is then inserted into the test position determining groove 111a of the interlock plate 107 disposed at the cradle 110 by pulling out the breaker main body 100 by use of the manipulation handle. Here, the test position designates a position at which the terminals 104, 105 and 106 of the breaker main body 100 are separated from the corresponding power source side terminal and load side terminal 110a of the cradle 110. At the test position, only a switching operation test of the breaker main body 100 is executable in a state of control power being merely supplied. Consequently, the position indicating plate 120 installed at the lower surface of the movable carriage 170 is rotated down based upon the pivot pin 130, by contacting the first guiding surface 161 of the indication supporter 150.

Here, the position indicating arrow of the position indicating plate 120 is appeared through the lower window 171 of the movable carriage 170. That is, the arrow indicates TEST of the marking portions 172 marked at the sides of the windows 171. Therefore, the operator can identify through the window 171 that the breaker main body 100 is located at the test position.

Now, description will be given of an operation that the operator changes a position of the breaker main body 100 from the test position to the run position at which the terminals 104, 105 and 106 of the breaker main body 100 are connected to the power source side terminal and the load side terminal 110a of the cradle 110 so as to be connected to an external circuit between a power source and a load.

The operator holds up the interlock rod 107 to separate the interlock rod 107 from the test position determining groove 111a. Then, if the operator pushes the breaker main body 100 toward the terminals 110a of the cradle 110, the breaker main body 100 is moved towards the terminals 110a of the cradle 110 as wheels of the movable carriage 170 are rolled. Accordingly, the terminals 104, 105 and 106 of the breaker main body 100 are electrically and mechanically connected to the power source side terminal and the load side terminal 110a of the cradle 110, such that the breaker main body 100 is electrically connected to the external circuit between the power source and the load. Here, the interlock rod 107 is inserted into the run position determining groove 111b of the cradle 110.

Accordingly, the position indicating plate 120 attached onto the movable carriage 170 of the breaker main body 100 is rotated based upon the pivot pin 130 to be held up, by contacting the third guiding surface 163 via the second guiding surface 162 of the indication supporter 150. Consequently, the position indicating arrow of the position indicating plate 120 is appeared through the upper window 171 so as to indicate the run position through the window 171. That is, the operator can identify through the window 171 that the circuit breaker is located at the run position.

As described above, the position indicating device for the circuit breaker according to the present invention is configured such that the indication supporter disposed at the cradle and having the first, second and third guiding surfaces and the arrow of the position indicating plate mounted at the movable carriage and rotated based upon the pivot pin disposed at the bracket are employed so as to indicate the test position and the run position through the windows of the frame portion. Therefore, the position of the circuit breaker can be automatically indicated in response to the movement of the breaker main body and accordingly the operator can identify the position of the circuit breaker fast and precisely.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A position indicating device for a circuit breaker, the circuit breaker comprising a breaker main body having a switching mechanism for closing or opening an electrical circuit and contacts and configured to be movable, a cradle having terminals electrically connected to an electrical power source or an electrical load of the electric circuit and terminals electrically connected to the breaker main body, and a movable carriage configured to support the breaker main body and convey the breaker main body to a run position at which the breaker main body is electrically connected to the terminals of the cradle and to a test position at which the breaker main body is electrically separated from the terminals of the cradle and a test for the breaker main body is available, the position indicating device comprising:
   a position indicating plate installed at a lower surface of the movable carriage to be rotatable up and down and having a portion for indicating a position of the breaker main body;
   an indication supporter installed at the cradle and having stepped pressing surfaces for contacting the position indicating plate; and
   a frame portion of the movable carriage, the frame portion having windows for externally showing the portion for indicating the position of the breaker main body in accordance to the rotation of the position indicating plate
   a pivot pin fixed to the lower surface of the movable carriage and configured to rotatably support the position indicating plate;
   a return spring disposed at the lower surface of the movable carriage and configured to apply an elastic force to the position indicating plate in one direction; and
   a bracket installed at the lower surface of the movable carriage and having supporting plates for supporting both end portions of the pivot pin.

2. The device of claim 1, wherein the bracket further comprises:
   a fixed plate fixed to the lower surface of the movable carriage; and
   a restricting plate that provides a space, in which the position indicating plate is rotatable, by being disposed to face the fixed plate and that cooperates with the fixed plate to define a rotation range of the position indicating plate.

3. The device of claim 2, wherein the return spring comprises:
   an upper wire supported by the fixed plate; and
   a lower wire supported by the position indicating plate,
   wherein a connection portion between the upper wire and the lower wire is wound on the pivot pin.

4. The device of claim 1, wherein the indication supporter comprises:
   coupling plate portions disposed at both sides at a bottom surface of the cradle in a proceeding direction of the movable carriage; and
   a pressing plate portion disposed between the coupling plate portions and having a plurality of plate parts for pressing the position indicating plate by stages, the plurality of plate parts having different heights.

5. The device of claim 4, wherein the pressing plate portion comprises:
   a first guide surface coming in contact with the position indicating plate at a test position;
   a second guide surface protruding higher than the first guide surface; and
   a third guide surface protruding higher than the second guide surface and coming in contact with the position indicating plate at a run position.

* * * * *